UNITED STATES PATENT OFFICE.

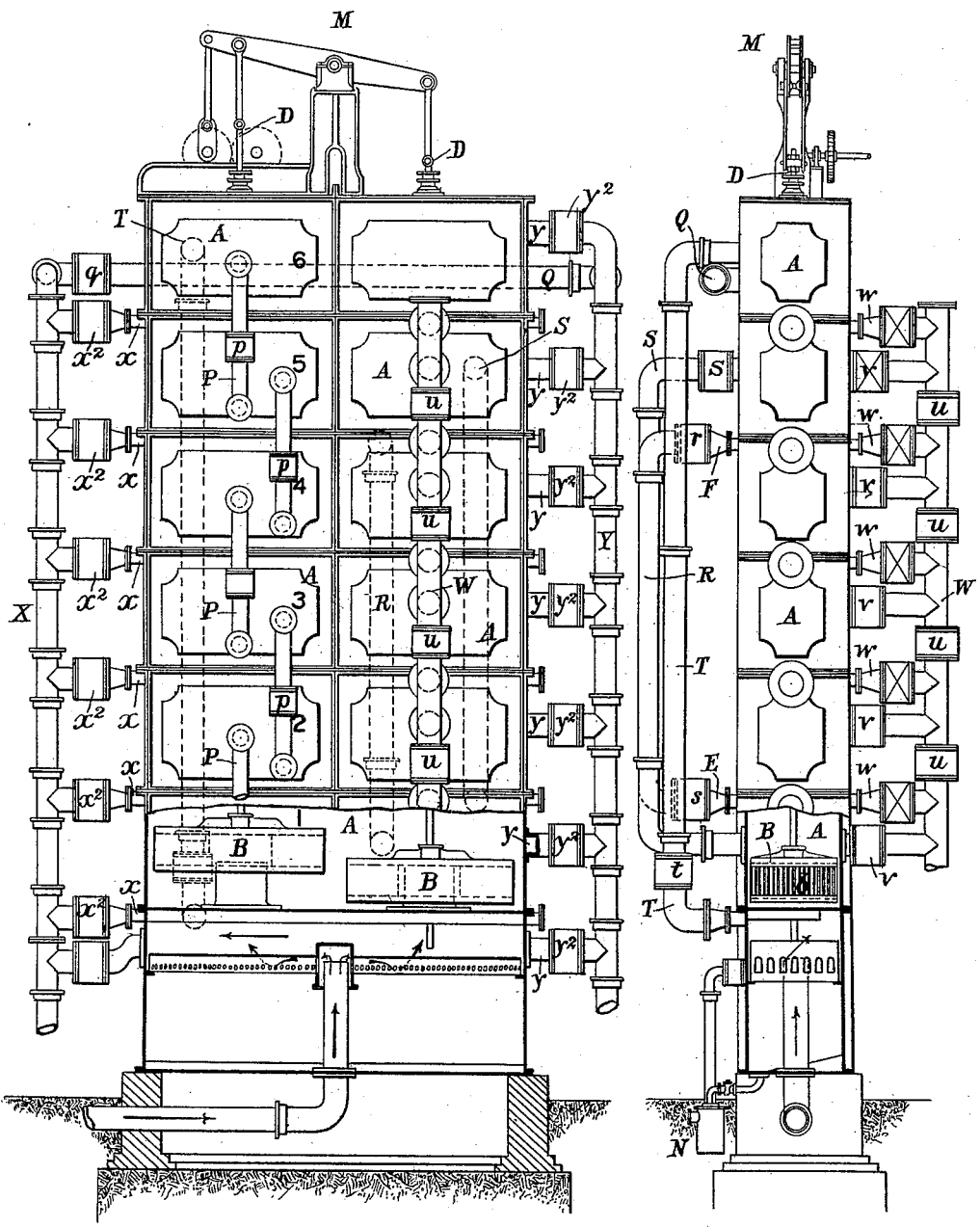

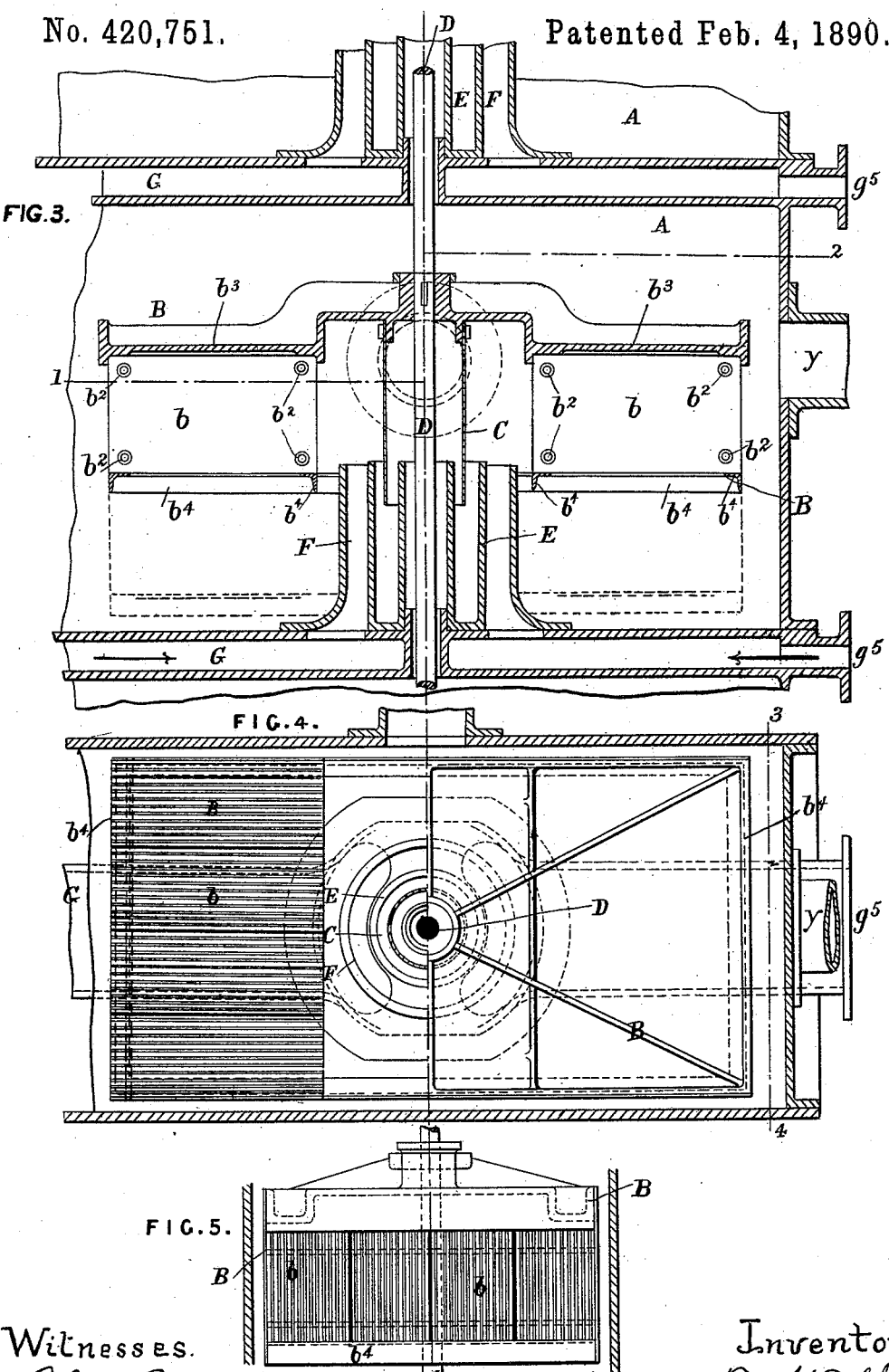

WILLIAM T. WALKER, OF BISHOPSWOOD ROAD, HIGHGATE, COUNTY OF MIDDLESEX, ENGLAND.

GAS-WASHER.

SPECIFICATION forming part of Letters Patent No. 420,751, dated February 4, 1890.

Application filed November 30, 1888. Serial No. 292,207. (No model.) Patented in England October 17, 1888, No. 14,925.

*To all whom it may concern:*

Be it known that I, WILLIAM THOMAS WALKER, esquire, a subject of the Queen of Great Britain, residing at Bishopswood Road, Highgate, in the county of Middlesex, England, have invented certain Improvements in Apparatus to be Used in the Purification of Coal-Gas, (for which I have applied for a patent in Great Britain, No. 14,925, dated the 17th day of October, 1888,) of which the following is a specification.

My invention has reference to apparatus for purifying coal-gas—such, for example, as the apparatus described in the specification of Letters Patent No. 245,527, of August 9, 1881, in which apparatus surfaces are alternately submerged in liquid and raised by a vertical reciprocating dipping movement, so that they when raised present a freshly-wetted surface to the gas to be purified, which passes in contact therewith.

Apparatus of this description is very liable to become clogged and inoperative by the accumulation of dense matters; and it is the object of my invention to overcome this objection and reduce the first cost of the apparatus, and to simplify it and generally render it better adapted for use, as hereinafter described.

I will describe my invention with reference to the accompanying drawings, whereof—

Figures 1 and 2 are elevations at right angles to each other (the lower parts being in section) of an apparatus arranged according to my invention. Fig. 3 is an enlarged section of a part of the same. Fig. 4 is a horizontal section on the line 1 2, Fig. 3. Fig. 5 is a vertical section on the line 3 4, Fig. 4.

According to my present invention I construct frames B, preferably of cast-iron, to contain the wetted surfaces, the said frames being open at the bottom and at the sides. They are operated by a reciprocating vertical dipping movement, and the said boxes are at each downward movement entirely submerged, so that the liquid scours and washes the said surfaces, and any thick or dense matter is carried freely off and discharged clear of them. The surfaces contained in the said boxes I may make of any suitable material; but I prefer for the purpose either plain iron plates or thin boards of wood $b$, which may be connected together in groups by bolts $b^2$, passing through all the plates or boards. Distance-pieces are placed between the plates or boards to keep the proper spaces between them. They are supported at their ends upon the angle-bars $b^4$. The said plates or boards $b$ are set vertically and a free way is left between them to allow the dense or thick matter to be washed freely from them. The said spaces are entirely free and open at the bottom and at the sides, as shown clearly at Fig. 5, and there is also a space between the tops of the said plates or boards and the top of the box B, as at $b^3$ in Fig. 3, to allow of the free passage of the washing-liquid. Thus arranged the apparatus is adapted for purifying the gas as it passes from the condensers to the purifiers, and it may be used either in place of or in combination with the ordinary apparatus for purifying gas by oxide of iron or lime. I effect this by isolating the interiors of the superposed tanks A from each other by a gas-tight seal consisting of an inverted bell C, which is secured to the casting B, and that in turn is secured to the operating-shaft D. The said bell C dips into a vessel E, secured to the tank and containing liquid, so that the joint is maintained by the liquid as the shaft D reciprocates vertically. The gas-inlet passage to each tank is at F external to the said seal and between the opposite sets of wetted surfaces $b\ b$, and receives the gas to be purified, preferably, from a flat connecting-passage G beneath each tank A, and with a mouth at each side of the machine—one for the attachment of the branch from the inlet-main and the other at $g^5$ for facilitating cleaning. The machine, thus having each of its superposed tanks A isolated one from the other and so constructed as to bring its inlets and outlets to its exterior, can be arranged with a system of connecting-pipes and valves, enabling the gas which is to be purified to be brought into communication with any chemical agent in either or any of the tanks in any order desired. Thus the gas after having its tar extracted in the lowermost portion of the machine may be conducted from No. 1 tank through all the tanks above to No. 6 tank, or either of the tanks may be "by-passed;" or the gas may be conducted so as to work right round in a circuit. For example, it may be conducted first to tanks Nos. 5 and 6, and thence to tanks Nos. 1, 2, 3, and 4. These connections and valves, as shown in Figs. 1 and 2, are as follows:

X is the general inlet-main, having a branch $x$ and a valve $x^2$ to each tank leading into the passage G.

Y is the general outlet-main, having a branch $y$ and valve $y^2$ to each tank.

W is a main for working or by-passing any of the tanks, the said main having inlet branches and valves $w$, outlet branches and valves $v$, and by-pass valves $u$ to each tank.

T is the return-main for conveying the gas from No. 6 tank at the top to No. 1 at the bottom, and $t$ is its valve.

S is a pipe for conveying the gas from No. 5 tank to No. 2, and $s$ are its valves.

R is a pipe for conveying the gas from No. 1 tank to No. 5 tank, and $r$ is its valve.

Q is the general by-pass main for by-passing the whole of the tanks, and $q$ is its valve.

P are the liquor-overflow pipes for conveying the purifying-liquids from one chamber to another, and $p$ are their valves.

The gas-inlet is shown by the arrows in the lower part of Fig. 1.

N is the tar-well.

M is the apparatus for reciprocating the boxes B.

I claim as my invention—

1. A gas-purifying apparatus provided with vertically-reciprocating frames having vertical plates with free spaces between them open at the bottom and the sides, in combination with tanks isolated from each other and containing liquid to wet the said plates at each downward movement, as and for the purpose set forth.

2. In an apparatus for purifying gas, the combination, with superposed tanks and valved overflow-pipes, of a main inlet-pipe having a valved branch to each tank, a main outlet-pipe with a valved branch from each tank, a valved by-pass main W, having valved branches to and from each tank, valved by-pass pipes R, S, and T, and a general by-pass, substantially as and for the purpose set forth.

3. In an apparatus for purifying gas, superposed tanks, a vertically-reciprocating shaft passing through the said tanks, and wetting-frames within the tanks and carried by the shaft, in combination with liquid seals surrounding the shaft to isolate the tanks from each other, substantially as and for the purpose set forth.

In testimony whereof I have signed my name to this specification in the presence of two subscribing witnesses.

WILLIAM T. WALKER.

Witnesses:
WILLIAM F. UPTON,
    47 *Lincoln's Inn Fields.*
HENRY D. HOSKINS,
    9 *Birchin Lane.*